Jan. 24, 1928.　　　　　O. C. KUEHNE　　　　　1,657,404
VALVE
Filed April 29, 1925　　　2 Sheets-Sheet 1

Inventor
O. C. Kuehne.
By
Lacey & Lacey, Attorneys

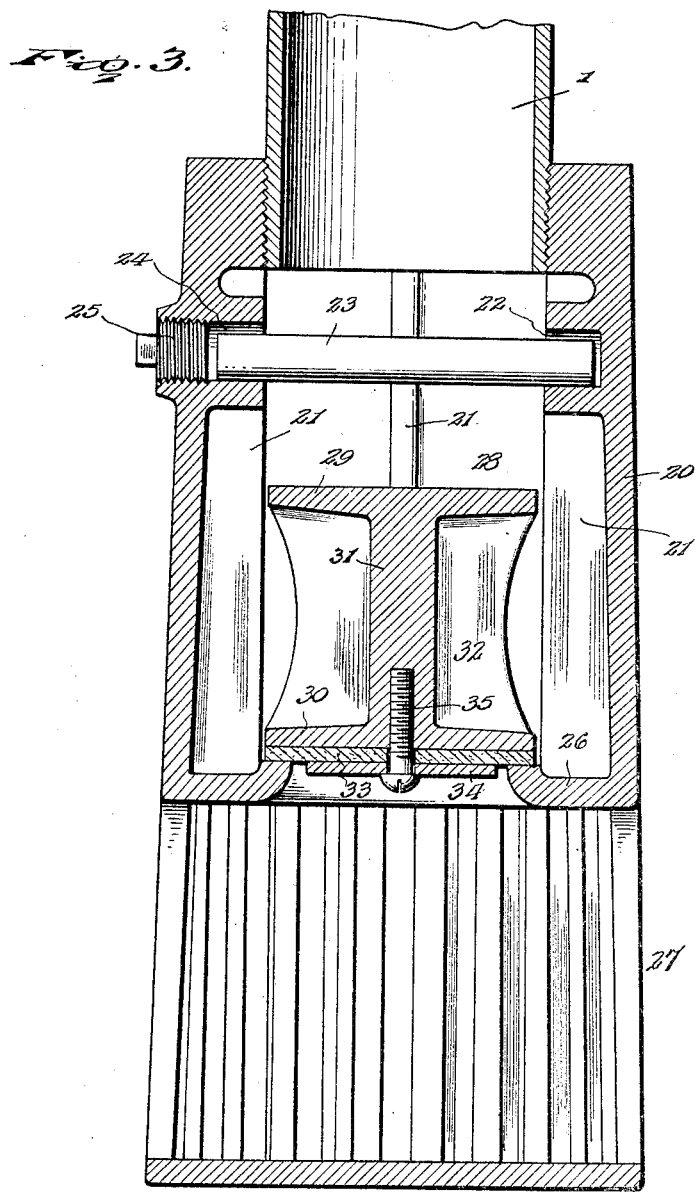

Patented Jan. 24, 1928.

1,657,404

UNITED STATES PATENT OFFICE.

OSCAR C. KUEHNE, OF SAN ANTONIO, TEXAS.

VALVE.

Application filed April 29, 1925. Serial No. 26,716.

This invention relates to valves and has special reference to foot valves which are employed at the foot of a suction tube through which liquid is drawn from a well or tank by the action of a pump. The invention seeks to provide a novel construction whereby leakage between the strainer and the valve casing will be eliminated and the cost of production will be minimized while the efficiency of the valve will be increased. The invention also seeks to provide means whereby the assembling of the parts will be facilitated. The invention is illustrated in the accompanying drawings and will be hereinafter fully described, the novel features being particularly pointed out in the appended claims.

In the drawings:

Fig. 3 is a view similar to Fig. 1 but showing a somewhat different construction.

Figure 1:
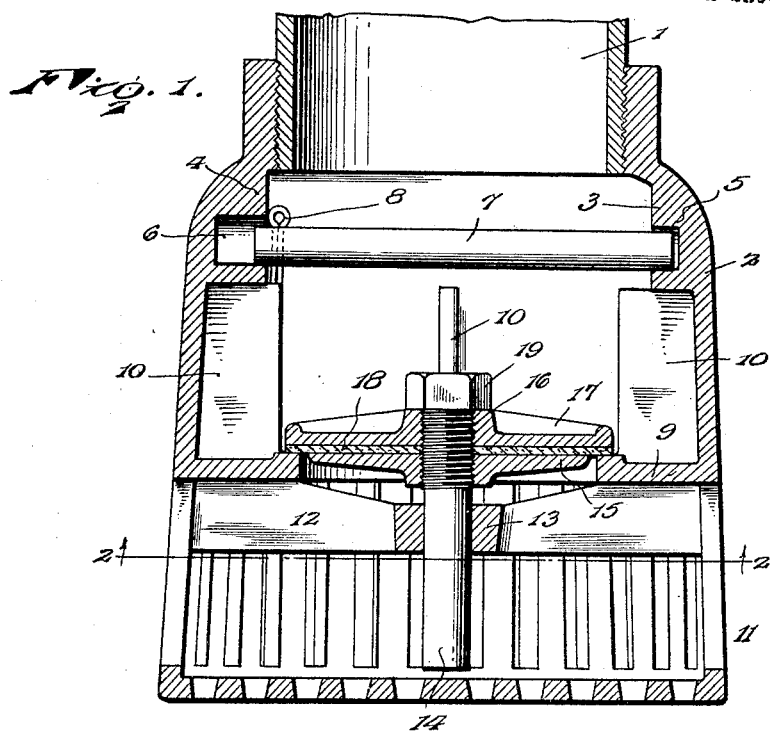
Figure 1 is a vertical diametrical section of one embodiment of the invention.
Figure 2:
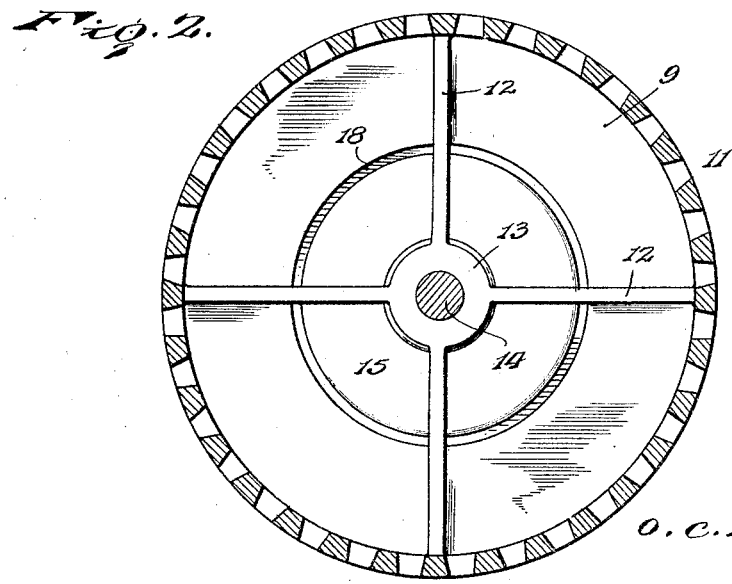
Fig. 2 is a horizontal section on the line 2—2 of Fig. 1.

In the drawings, the reference numeral 1 indicates a suction tube which is connected at its upper end with a pump and at its lower end is threaded to facilitate the securing of a valve casing 2 thereon. As shown in Figs. 1 and 2, the valve casing 2 is flared slightly downwardly and is provided at diametrically opposite points adjacent its upper end with internal enlargements 3 and 4 having sockets 5 and 6 formed respectively therein. The socket 6 is somewhat larger than the socket 5, as clearly shown, and this construction facilitates the engagement of a retaining pin 7 in the valve casing. After the valve has been placed in position, one end of the pin 7 may be inserted through the open upper end of the casing and engaged in the larger socket 6, the dimensions of which will permit the pin to be slid thereinto to an extent sufficient to permit it to be swung downwardly so as to assume a horizontal position across the valve casing, whereupon it may be slid diametrically so that the opposite end of the pin will engage and rest in the socket 5. A cotter pin 8 may then be inserted through the pin immediately adjacent the enlargement 4 so that endwise movement of the pin will then be prevented. At the lower end of the valve casing is formed an integral inwardly projecting valve seat 9 of circular form and coextensive with the inner circumference of the valve casing. Guide ribs 10 may be formed upon the inner circumference of the valve casing and extend between the respective enlargements or lugs 3 and 4 and the valve seat, as clearly shown in Fig. 1. The strainer 11 may be of any preferred form and is cast integral with the valve casing so that its external surface is flush with and forms a downward continuation of the wall of the valve casing, the valve seat 9 being in overhanging relation to the strainer. Formed integral with the strainer and the valve seat on the under side of the valve seat is a spider consisting of radial arms 12 and a central hub or collar portion 13 which integrally connects the inner ends of the radial arms, the said collar or hub being alined axially with the opening through the valve seat and constituting a guide for the lower portion of the valve stem 14. The valve, in the present embodiment of the invention, consists of a lower disk 15 which is engaged upon an upper threaded portion 16 of the stem, an upper disk 17 which may be likewise engaged upon the threaded portion of the stem and is of greater diameter than the lower disk whereby the upper disk may engage marginally with the valve seat while the lower disk may enter the central opening defined by the valve seat, as clearly shown in Fig. 1. A packing 18 of any suitable material is arranged between the disks 15 and 17 so that, when the disks are properly secured upon the valve stem, the packing will be compressed and firmly held so that in the closed position of the valve leakage past the valve seat will be overcome. A lock nut 19 may be fitted upon the valve stem to bear upon the upper disk 17 and thereby prevent accidental or premature loosening of the disks with a consequent failure of the valve to operate efficiently.

In Fig. 3, I have shown a different form of valve and the valve casing 20 is somewhat different in its outline but is essentially the same as the valve casing 2 previously described. This valve casing 20 is provided with the internal guide ribs 21 corresponding to the guide ribs 10 in the previously described form of the invention and is also provided with a socket 22 to receive one end of the retaining pin 23. Diametrically opposite the socket 22, however, the wall of the valve casing has an opening 24 formed therethrough, the outer end of which may be closed by a screw plug 25. With this arrangement, after the valve has been placed in position within the valve casing, the pin 23 is simply inserted endwise through the opening 24 so as to rest in the socket 22 and the plug 25 is then turned home. The valve seat 26 is formed integral with the lower end of the valve casing, as shown and as practiced in connection with the first described form of the invention. The strainer 27 is also formed integral with the lower end of the valve casing and forms a downward continuation of the wall of the valve casing and may be of any desired configuration. The bottom of the strainer 27 is shown imperforate instead of having perforations, as shown in Fig. 1, while the wall of the strainer is provided with vertical slots or openings to permit the liquid to flow to and into the valve casing. In the embodiment of the invention shown in Fig. 3, the guiding spider on the under side of the valve seat is omitted and instead of the disk valve illustrated in Fig. 1 I employ the freely movable spool valve 28 which consists of an upper head 29, a lower head 30 and a central hub or body 31 connecting the heads. The heads 29 and 30 should be of such diameter that they will fit easily between the guide ribs 21 upon the valve casing but will be held by the ribs against lateral movement which would take the valve out of axial alinement with the valve seat. Ribs 32 may be provided upon the central body or hub 31 of the valve and extend between the heads thereof so as to strengthen the heads if so desired. Against the under side of the lower head 30 is placed a packing disk 33 and a washer 34 is placed against the under side of the packing, a screw 35 being inserted through the washer and the packing into the lower end of the valve to secure the washer and the packing firmly in place.

In both illustrated forms of the invention, the valve will seat by its own weight when the pump is not in operation. On the up or suction stroke of the pump, the valve will be raised to the extent permitted by the retaining pin 7 or 23, as the case may be, and liquid will then flow through the strainer and the opening or port through the valve seat into the valve casing, flowing around the valve into the suction tube. On the reverse stroke of the pump, the valve will seat by gravity and will thereby retain in the suction tube the liquid which previously entered the same.

It will be readily noted that my construction entirely eliminates all joints between the strainer and the valve casing so that there will be no leakage and there can be no rusting which tends to make the repairing of the device laborious. Furthermore, the necessity for machine work in finishing the valve casing or the valve is practically eliminated so that the cost of manufacture is minimized. The parts can be very easily assembled and a valve of any desired size may be readily installed at a minimum cost. Inasmuch as there is no joint between the strainer and the valve casing, there is no gasket necessary and, consequently, there can be no wearing out of a gasket. It will also be noted that there are no external projections on the device and it may be consequently safely let down into a deep well, the diameter of which is very slightly greater than the diameter of the extreme lower end of the strainer. While I have shown the end of the plug projecting slightly beyond the surface of the valve casing in Fig. 3, it will be understood that these surfaces may be flush and other changes may be made in the minor details without involving any departure from the spirit or scope of the invention as the same is defined in the following claims.

Having thus described the invention, I claim:

1. In a foot valve, a valve casing having an inwardly extending valve seat formed integral with its lower end and provided internally adjacent its upper end with lugs having axially alined sockets therein, the socket in one lug being of greater diameter than the socket in the other lug, a retaining pin engaged in and held by said sockets, a stop member engaged with said pin adjacent one end thereof to extend across the mouth of the larger socket, and a freely movable valve disposed between the valve seat and the said retaining pin.

2. A foot valve consisting of an integral valve casing formed at its upper end to be secured to a pump barrel and having an integral flat valve seat at its lower end, an integral strainer including a bottom and a side wall with its side wall integral with the side wall and valve seat of the casing, the valve seat overhanging the strainer, a spider integral with the under side of the valve seat and with the wall of the strainer at the junction of the valve seat, and said wall and extending across the valve seat, a freely movable disk valve within the casing normally resting by gravity on the valve seat, and a stem depending centrally from the valve through the spider and fitting closely but slidably within the spider to be guided thereby.

In testimony whereof I affix my signature.

OSCAR C. KUEHNE. [L. S.]